(12) United States Patent
Zou et al.

(10) Patent No.: US 9,185,072 B2
(45) Date of Patent: Nov. 10, 2015

(54) STATELESS NAT44

(71) Applicant: Futurewei Technologies, Inc., Plano, TX (US)

(72) Inventors: Ting Zou, Santa Clara, CA (US); Xushan Lu, Shenzhen (CN); Jing Huang, Shenzhen (CN); Min Zha, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 356 days.

(21) Appl. No.: 13/893,713

(22) Filed: May 14, 2013

(65) Prior Publication Data
US 2013/0301650 A1    Nov. 14, 2013

Related U.S. Application Data (60) Provisional application No. 61/646,572, filed on May 14, 2012.

(51) Int. Cl.
  *H04J 3/16* (2006.01)
  *H04L 29/12* (2006.01)

(52) U.S. Cl.
  CPC .......... *H04L 61/251* (2013.01); *H04L 61/2514* (2013.01); *H04L 61/2557* (2013.01)

(58) Field of Classification Search
  CPC ... H04L 61/25; H04L 61/2517; H04L 61/256; H04L 61/2514
  USPC ......................................................... 370/467
  See application file for complete search history.

(56) References Cited

U.S. PATENT DOCUMENTS

| | | | |
|---|---|---|---|
| 6,331,984 B1 * | 12/2001 | Luciani ......................... | 370/401 |
| 7,333,510 B1 * | 2/2008 | Hies et al. ..................... | 370/467 |
| 8,462,800 B2 * | 6/2013 | Saito et al. .................... | 370/401 |
| 8,687,631 B2 * | 4/2014 | Gundavelli et al. ........... | 370/389 |
| 9,036,633 B2 * | 5/2015 | Sarikaya ........................ | 370/390 |
| 2004/0076180 A1 * | 4/2004 | Satapati et al. ................ | 370/467 |
| 2008/0175252 A1 * | 7/2008 | Wang ........................ | 370/395.31 |
| 2008/0225868 A1 * | 9/2008 | Sehgal et al. ................. | 370/401 |
| 2009/0213811 A1 * | 8/2009 | Wang et al. .................... | 370/331 |

(Continued)

OTHER PUBLICATIONS

Troan, O., et al., "Mapping of Address and Port (MAP)," Network Working Group, Internet Draft, draft-mdt-softwire-mapping-address-and-port-03, Jan. 30, 2012, 19 pages.

(Continued)

*Primary Examiner* — Dang Ton
*Assistant Examiner* — Abdeltif Ajid
(74) *Attorney, Agent, or Firm* — Conley Rose, P.C.; Grant Rodolph; Brandt D. Howell (57) ABSTRACT

An apparatus comprising a memory, and a processor coupled to the memory and configured to receive a mapping rule that associates a downstream internal Internet Protocol version four (IPv4) address prefix to an upstream external IPv4 address prefix, receive a first IPv4 packet from an upstream network node with a destination address field comprising an external IPv4 address comprising the external prefix, and perform a first network address translation IPv4 to IPv4 (NAT44) process by replacing the external IPv4 address in the first IPv4 packet's destination address field with an internal IPv4 address based on the mapping rule, wherein the internal IPv4 address comprises the internal prefix and a port set identifier (ID) associated with set of destination ports at a downstream node assigned to receive the first IPv4 packet.

23 Claims, 9 Drawing Sheets

(56) References Cited

U.S. PATENT DOCUMENTS

| | | | |
|---|---|---|---|
| 2012/0236733 A1* | 9/2012 | Deu-Ngoc et al. | 370/252 |
| 2013/0201999 A1* | 8/2013 | Savolainen et al. | 370/467 |
| 2013/0279519 A1* | 10/2013 | Lu et al. | 370/467 |

OTHER PUBLICATIONS

Durand, A., et al., "Stateless Deterministic NAT," Internet Engineering Task Force, Internet Draft, draft-penno-softwire-sdnat-00, Oct. 25, 2011, 15 pages.

Penno, R., et al., "Stateless Deterministic NAT," Internet Engineering Task Force, Internet Draft, draft-penno-softwire-sdnat-01, Nov. 1, 2011, 17 pages.

Penno, R., et al., "Stateless DS Lite," Internet Engineering Task Force, Internet Draft, draft-penno-softwire-sdnat-02, Mar. 11, 2012, 12 pages.

Despres, R., Ed., et al., "IPv4 Residual Deployment via IPv6—Unified Solution (4rd)," Internet Engineering Task Force, Internet Draft, draft-despres-softwire-4rd-u-06, Mar. 28, 2012, 36 pages.

Tsou, T., et al., "Stateless IPv4 Network Address Translation," Network Working Group, Internet Draft, draft-tsou-stateless-nat44-02, Oct. 22, 2012, 13 pages.

Ziemba, G., et al., "Security Considerations for IP Fragment Filtering," Network Working Group, RFC 1858, Oct. 1995, 10 pages.

Bradner, S., "Key Words for Use in RFCs to Indicate Requirement Levels," Network Working Group, RFC 2119, Mar. 1997, 4 pages.

Miller, I., "Protection Against a Variant of the Tiny Fragment Attack," Network Working Group, RFC 3128, Jun. 2001, 5 pages.

Heffner, J., et al., "IPv4 Reassembly Errors at High Data Rates," Network Working Group, RFC 4963, Jul. 2007, 11 pages.

Larsen, M., et al., "Recommendations for Transport-Protocol Port Randomization," Internet Engineering Task Force (IETF), RFC 6056, Jan. 2011, 30 pages.

Bagnulo, M., et al., "Stateful NAT64: Network Address and Protocol Translation from IPv6 Clients to IPv4 Servers," Internet Engineering Task Force (IETF), RFC 6146, Apr. 2011, 46 pages.

Ford, M., Ed., et al., "Issues with IP Address Sharing," Internet Engineering Task Force (IETF), RFC 6269, Jun. 2011, 30 pages.

\* cited by examiner

STATELESS NAT44

CROSS-REFERENCE TO RELATED APPLICATIONS

The present application claims priority to U.S. Provisional Patent Application 61/646,572, filed May 14, 2012 by Ting Zou, et. al., and entitled "Stateless NAT44," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Networks may be interconnected to other networks to allow Network Elements (NEs) to communicate on a global scale, for example via the Internet. NEs and/or nodes may be assigned Open Systems Interconnection (OSI) model layer 2 network addresses, such as Media Access Control (MAC) addresses, and layer 3 addresses, such as Internet Protocol (IP) addresses. Legacy systems may employ an IP version four (IPv4) addressing scheme, which may designate a node by using a thirty two bit address. The IPv4 addressing scheme may be unsuitable to maintain enough addresses for the rapidly increasing number of devices connecting to the Internet, which has led to the creation of the IP version six (IPv6) addressing scheme that employs one hundred twenty eight bit addresses. Upgrading systems from IPv4 to IPv6 may be costly. As such, various systems may be employed to effectively increase the pool of available IPv4 addresses for legacy networks until such legacy networks can be completely upgraded to employ the newer IPv6 standards.

SUMMARY

In one embodiment, the disclosure includes an apparatus comprising a memory, and a processor coupled to the memory and configured to receive a mapping rule that associates a downstream internal IPv4 address prefix to an upstream external IPv4 address prefix, receive a first IPv4 packet from an upstream network node with a destination address field comprising an external IPv4 address comprising the external prefix, and perform a first network address translation IPv4 to IPv4 (NAT44) process by replacing the external IPv4 address in the first IPv4 packet's destination address field with an internal IPv4 address based on the mapping rule, wherein the internal IPv4 address comprises the internal prefix and a port set identifier (ID) associated with set of destination ports at a downstream node assigned to receive the first IPv4 packet.

In another embodiment, the disclosure includes a computer program product comprising computer executable instructions stored on a non-transitory computer readable medium such that when executed by a processor cause a NE to assign an IPv4 address and a port set ID to an end node, and configure a stateless network address translation IPv4 to IPv4 (SLNAT44) device with a set of mapping rules, wherein at least one of the mapping rules comprises an internal prefix associated with the end node, an external prefix associated with the end node, a length of the internal prefix, and a length of the external prefix.

In another embodiment, the disclosure includes a method comprising receiving a set of mapping rules, wherein each of the mapping rules comprises an internal prefix, an external prefix, a length of the internal prefix, a length of the external prefix, and a port set mask, receiving a first packet on an internal interface, finding a mapping rule with an internal prefix that matches a source address of the first packet, extracting a port set ID from the first packet's source address, checking whether a source port of the first packet is within an allowed set using the found mapping rules port set mask, building an external address by concatenating the found mapping rule's external prefix with an external suffix extracted from the first packet's source address when the first packet's source port is within the allowed set, replacing the first packet's source address with the external address when the first packet's source port is within the allowed set, and forwarding the first packet when the first packet's source port is within the allowed set.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

IPv4 address exhaustion has become world-wide reality. NAT may be a solution to deal with the IPv4 address exhaustion problem. The drawbacks of NAT may include statefulness and the need to track transport-layer sessions. As such, NAT may be complex, hard to scale up, and fragile.

Disclosed herein is a method, apparatus, and/or system for a method of deploying stateless NAT as a backwards-compatible evolution of an IPv4-only network. An Internet Service Provider (ISP) network may provision a customer premises equipment (CPE), and/or hosts positioned behind the CPE, with IPv4 address(es), a port set ID, and a port set mask. The ISP network may also configure a NAT44 device with a mapping rule comprising an internal IPv4 prefix associated with the provisioned IPv4 address(es), an external IPv4 address, and the port set mask. The NAT44 device may use the mapping rule to translate external public IPv4 addresses to internal private IPv4 addresses and vice versa without regard to specific sessions and without maintaining associated state data. As such, the NAT44 device may be considered a stateless NAT44 device or SLNAT44 device. In an embodiment, a SLNAT44 device may receive a packet from a downstream source that comprises an internal IPv4 source address. The SLNAT44 may use the internal IPv4 prefix from the source IPv4 address to find the associated mapping rule. The SLNAT44 device may also extract an external suffix and a port set ID embedded in the source IPv4 address suffix. The SLNAT44 may use the mapping rule port set mask and port set ID to determine a set of source ports that are allowed to send the packet. If the packet was sent from an allowed source port, the SLNAT44 may create an external IPv4 address by concatenating an external IPv4 prefix associated with the mapping rule with the extracted external suffix. The SLNAT44 may then replace the packet source address with the external IPv4 address and forward the packet upstream. In another embodiment, the SLNAT44 may receive a packet from an upstream source and find the associated mapping rule using the external IPv4 prefix in the packets destination address. The SLNAT44 may apply the mapping rule's port set mask to the packet's destination port to determine the port set ID. The SLNAT44 may also extract the external suffix from the packet destination address. The SLNAT44 may then build an internal IPv4 address by concatenating an internal IPv4 prefix associated with the mapping rule, the external suffix, and the port set ID. The SLNAT44 may then replace the destination address with the internal IPv4 address and forward the packet downstream. The allowable port set may be continuous or discontinuous. Also, in another embodiment, the port set ID, otherwise known as port range bits, may be interspersed with the external suffix bits and the position of such bits may be communicated to the SLNAT44 device using the mapping rules. The devices and methods disclosed herein may be further discussed in Internet Engineering Task Force (IETF) document draft-tsou-stateless-nat44-02, which is incorporated herein by reference.

The present disclosure may employ the following terms, which may be defined as follows: (1) Port set: A set of transport-layer ports that may be assigned to a CPE and may be used as source ports by packets sent by the CPE; (2) Port Set ID: A value from which a unique port set may be algorithmically derived; (3) NAT44: IPv4-to-IPv4 NAT; (4) SLNAT44: Depending on the context, a stateless NAT44 protocol or a stateless NAT44 device that translates between internal and external IP addresses; (5) Internal Address: An IPv4 address assigned to an upstream interface of CPE or other device, which may be used in an ISP network between a CPE and a SLNAT44 device; (6) External Address: An IPv4 address used on the Internet and routed to a SLNAT44 device; and (7) Mapping rule: A set of parameters which may be configured on a SLNAT44 and may not be configured on a corresponding CPE, and may describe a relationship between an internal IPv4 address and an external IPv4 address.

Figure 1:
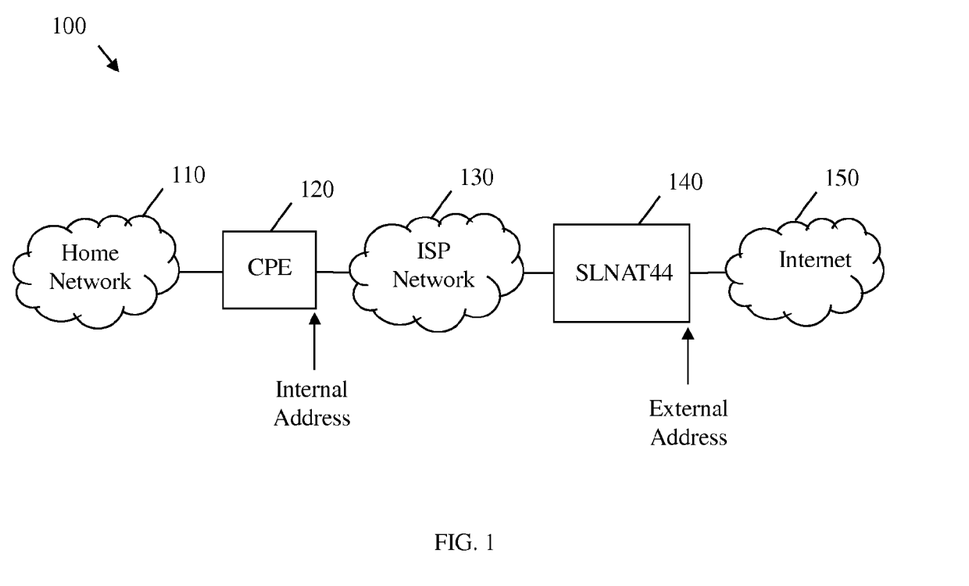
FIG. 1 is a schematic diagram of an embodiment of a SLNAT44 network architecture.

FIG. 1 is a schematic diagram of an embodiment of a SLNAT44 network architecture 100. Network 100 may comprise at least one home network 110 comprising a plurality of hosts (e.g. end user devices). The home network 110 may connect to a CPE 120. The CPE 120 may forward communications upstream to an ISP network 130. An SLNAT44 device 140 may be positioned at the edge of the ISP network 130, and the ISP network may connect to the Internet 150 via the SLNAT44 140. The home network 110, CPE 120, ISP network 130, and SLNAT44 140 may comprise IPv4 only devices. The Internet 150 may comprise both IPv4 and IPv6 devices. In an alternative embodiment, home network 110, CPE 120, ISP network 130, and/or SLNAT44 140 may comprise dual stack devices that employ both IPv4 and IPv6 components. The ISP network 130 may configure both the CPE 120 and the SLNAT44 140 so that the SLNAT44 140 may statelessly translate external IPv4 addresses in packets from the Internet 150 into internal IPv4 addresses that may recognized by devices downstream of the SLNAT44 140 and vice versa, respectively. It should be noted that, for purposes of clarity, downstream may refer to any device, location, packet, and/or other item in the direction of the home network 110 from a particular device, location, packet, and/or other item. Conversely, upstream may refer to any device, location, packet, and/or other item in the direction of the Internet 150 from a particular device, location, packet, and/or other item.

A home network 110 may comprise one or more hosts, which may act as end user devices. For example, the home network 110 may comprise personal computers (PCs), mobile phones, smart phones, laptop PCs, tablet PCs, server(s), internet based television equipment, or other end user devices that may wish to connect to the Internet 150. The hosts in the home network 110 may connect to the CPE 120 on boot up, logon, etc. The CPE 120 may assign IP addresses to each host on the home network 110. Alternatively, such home network 110 IP addresses may be assigned by another device in the home network 110, such as a router, and/or may be statically configured by a system administrator. The home network 110 IP addresses may be network specific and may not be recognized outside of the home network 110.

The CPE 120 may be any device that receives communications from the home network 110 and forwards such communications upstream toward the ISP network 130, and vice versa. For example, the CPE 120 may comprise an IP set top box, a cable modem, a Digital Subscriber Line (DSL) modem, a wireless access point, a router, a network switch, virtual switch, other residential and/or commercial network gateway. The CPE 120 may comprise downstream interface(s) (e.g. ports) that connect to the home network 110 and upstream interface(s) (e.g. ports) that connect to the ISP network 130. The CPE 120 may maintain routing tables and may route packets received from upstream toward the home network 110 hosts using layer 2 routing protocols (e.g. MAC address routing), layer 3 protocols (e.g. IP address routing), or combinations thereof. The IP addresses of the home network 110 may be network specific and may not be recognized outside of the home network 110. As such, CPE 120 may convert home network IP addresses to IP addresses recognized by the ISP 130 prior to forwarding packets upstream. The CPE 120 may also convert ISP 130 IP addresses to home network 110 IP addresses for packets coming downstream toward home network 110.

ISP network 130 may be any network configured to provide network connection services to a home network 110, and may be housed in a data center. The ISP network may assign an internal IPv4 address and/or an internal IPv4 prefix to the CPE 120. If an internal IPv4 prefix is assigned, the CPE 120 may assign IPv4 addresses to downstream nodes that comprise the IPv4 prefix, in which case the downstream node may employ IP address(es) that may be recognized by the ISP network 120 without conversion by the CPE 120. The ISP network 130 may provision an internal IPv4 address to the CPE's 120 upstream interface(s), for example, during the CPE's 120 start-up routine, using various protocols such as Dynamic Host Configuration Protocol (DHCP), Point-to-Point Protocol (PPP), etc.

The SLNAT44 140 may be positioned at the edge of the ISP network 130, and may comprise one or more upstream interfaces (e.g. ports) that receive packets from the Internet 150 and one or more downstream interfaces (e.g. ports) that receive packets from the ISP network 130. The SLNAT44 140 may be any device configured to statelessly translate packets using an internal IPv4 addressing scheme recognized by the ISP network 130 to an external IPv4 addressing scheme recognized by devices and/or networks residing in the Internet 150. For example, the SLNAT44 140 may be configured to operate in a border router positioned at the edge of a data center housing an ISP network 130. The SLNAT44 140 may not comprise any IPv6 components and may be used strictly to translate between adjacent IPv4 networks.

As shown in FIG. 1, the upstream interface(s) of the CPE 120 may be assigned an internal IPv4 address (e.g. wide area network (WAN) address) and the upstream interface(s) of the SLNAT44 140 may be assigned an external IPv4 address. As such, the SLNAT44 140 may translate between the internal address space used by the ISP network 130 and the external address space used by the Internet 150 and/or other upstream networks. The present disclosure describes a protocol for decentralizing IPv4 NAT from the SLNAT44 140 to the CPE 120 such that no state information may be kept on the central SLNAT44 140 device. The CPE 120 may employ a restricted source port set that may be encoded in the provisioned internal IPv4 WAN address. The SLNAT44 140 device may perform strictly stateless address translation and may not perform port translations.

In an embodiment, the ISP network 130 may provision the CPE's 120 upstream interface(s) with an internal IPv4 address, a port set ID, and a port set mask. The ISP network 130 may also configure the SLNAT44 device 140 with a set of mapping rules. Each mapping rule may comprise an internal IPv4 prefix, an external IPv4 prefix, and the port set mask. The internal prefix may comprise substantially the same higher order bits as the internal IPv4 address and may be used to route packets to the CPE 120. The external prefix may comprise substantially the same higher order bits as the external IPv4 address and may be used to route packets to the SLNAT44 140 device. The SLNAT44 140 may employ the mapping rule(s) to statelessly translate the internal IPv4 addresses to external IPv4 addresses, and vice versa. Such stateless translation may be device based and not session based. NAT devices may be limited to translating approximately 20 million session flows. Each host and/or CPE may be associated with a plurality of simultaneous flows. As such, stateless translation may increase the effective size of the available internal IPv4 address space, and therefore the scalability of NAT44, by allowing multiple session flows to share a common IPv4 address. Such flows may be differentiated based on port information. The stateless translation protocol may be discussed in more detail with respect to the figures below.

It should be noted that prefixes (e.g. external prefixes and internal prefixes) may be transmitted to the SLNAT44 140 in manner that indicates the prefix length. Further, rule prefixes may not overlap with other rules.

Figure 2:
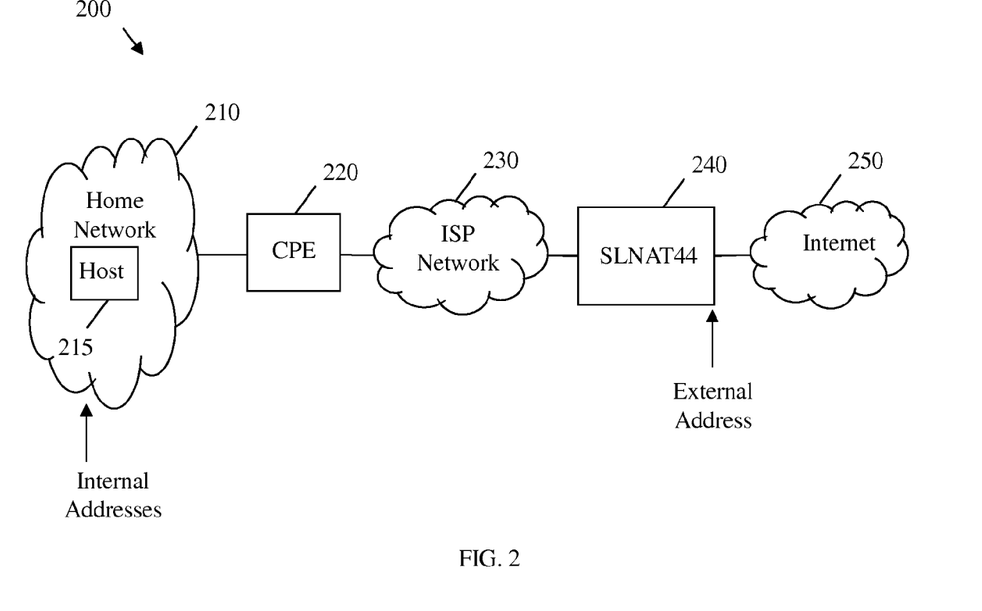
FIG. 2 is a schematic diagram of another embodiment of a SLNAT44 network architecture.

FIG. 2 is a schematic diagram of another embodiment of a SLNAT44 network architecture 200. Network 200 may comprise a home network 210, a CPE 220, an ISP network 230, an SLNAT44 240 and the Internet 250, which may be substantially similar to home network 110, CPE 120, ISP network 130, SLNAT44 140, and Internet 150. Home network 210 may comprise one or more hosts 215, which may be end user devices. CPE 220 may be configured to operate as a transparent bridge, and may not perform address translation between home network 210 and ISP network 230. As such, internal addresses may be assigned to the end hosts 215 instead of the CPE 220 upstream interface(s). When CPE 220 is operating in bridge mode, all provisioning and related functions that would be applied to CPE 120 in network 100 may instead be applied directly to hosts 215.

It should be noted that a CPE may be configured as either a gateway (e.g. CPE 120) or transparent bridge (e.g. CPE 220). In the gateway mode (e.g. network 100), packets sent upstream from the CPE may employ a provisioned IPv4 address as a source address and may employ a source port that is within an allowed set, which may be determined by applying the port set mask to the port set ID. The CPE may operate a NAT44 configured with the provisioned address and the allowed port set and may process all packets sent out the WAN interface (e.g. upstream). Packets received by the CPE on a WAN interface with a destination port outside the allowed range may be dropped.

In the bridge mode (e.g. network 200), the CPE 220 may only transfer packets and therefore the service of stateless NAT44 may be performed by the SLNAT44 240 directly towards end hosts 215, as such hosts 215 may operate as in-domain servers. Regardless of any mode of the CPE, the SLNAT44 operation may involve injecting private addresses (or prefixes) into the intra-domain backbone routing infrastructure. As such, it may be necessary for security purposes to operationally ensure that private addresses/prefixes do not leak into the backbone route tables unless such private addresses/prefixes are assigned by the SLNAT44 140 and/or 240 to CPEs 120 or directly to hosts 215. Also, if the CPE implements application level gateways (ALGs) such as File Transfer Protocol (FTP), Rapid Spanning Tree Protocol (RSTP), Point-to-Point Tunneling Protocol (PPTP), etc., the CPE may ensure that ports present in the packet payload fall within the range of allowed port sets when translated.

Figure 3:
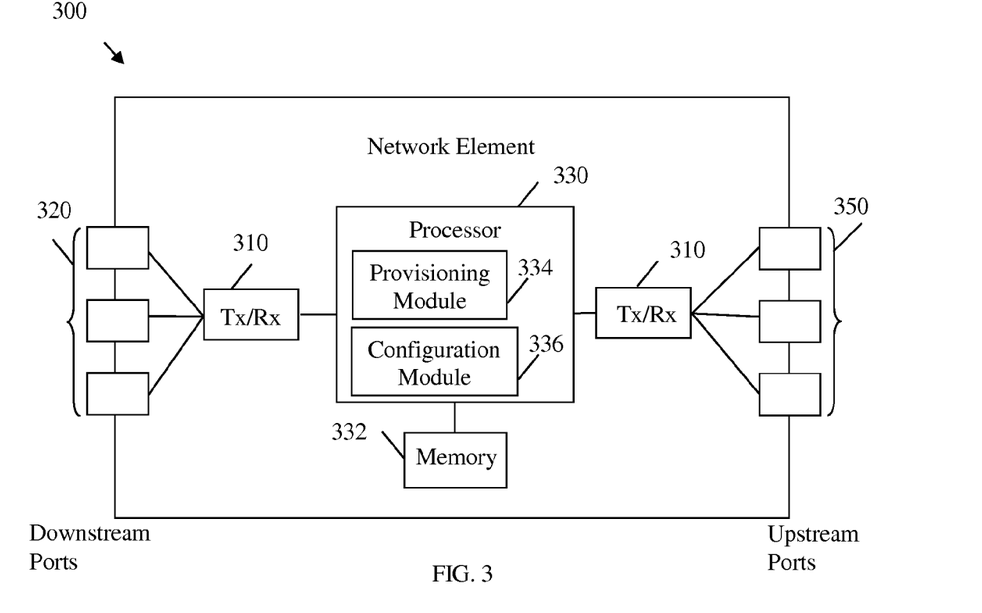
FIG. 3 is a schematic diagram of an embodiment of a NE within an Internet Service Provider (ISP) network.

FIG. 3 is a schematic diagram of an embodiment of a NE 300 within an Internet Service Provider (ISP) network (e.g. 130 and/or 230), which may be configured to provision IP related information to a CPE 120 and/or host 215 and/transmit a mapping rule and/or mapping rule sets to an SLNAT44 140 and/or 240. NE 300 may be implemented in a single node or the functionality of NE 300 may be implemented in a plurality of node in the ISP network. In some embodiments NE 300 may also act as other node(s) in network 100 and/or 200. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 300. For instance, the features/methods in the disclosure may be implemented using hardware, firmware, and/or software installed to run on hardware. The NE 300 may be any device that transports frames through a network, e.g., a switch, router, bridge, server, a client, etc. As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 coupled to plurality of upstream ports 350 for transmitting and/or receiving frames from other nodes, respectively. A processor 330 may be coupled to the Tx/Rxs 310 to process the frames and/or determine which nodes to send frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise a provisioning module 334, which may provision internal IPv4 address(es), port set ID(s), and/or port set mask(s) for (e.g. for CPE 120 and/or hosts 215) and transmit such provisioned information to the CPE 120 and/or host 215, respectively, via downstream ports 320. For example, the provisioning module 334 may perform step 701 of method 700 as discussed more fully hereinbelow. Processor 330 may also comprise a configuration module 336, which may configure a SLNAT44 device (e.g. SLNAT44 140 and/or 240) with mapping rules to support stateless NAT and may transmit such mapping rules to the SLNAT44 via upstream ports 350. For example, the configuration module 336 may perform step 703 of method 700 as discussed more fully hereinbelow. In an alternative embodiment, the provisioning module 334 and/or configuration module 336 may be implemented as instructions stored in memory 332, which may be executed by processor 330. In another alternative embodiment, the provisioning module 334 and the configuration module 336 may be implemented on separate NEs. The downstream ports 320 and/or upstream ports 350 may contain electrical and/or optical transmitting and/or receiving components. NE 300 may or may not be a routing component that makes routing decisions.

It is understood that by programming and/or loading executable instructions onto the NE 300, at least one of the processor 330, host configuration module 335, downstream ports 320, Tx/Rxs 310, memory 332, and/or upstream ports 350 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
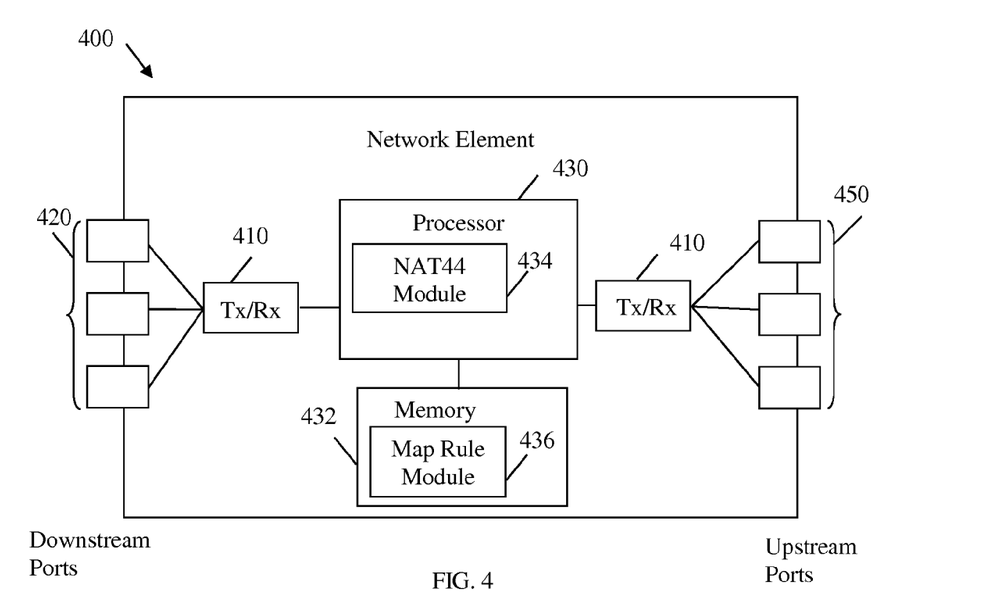
FIG. 4 is a schematic diagram of an embodiment of a NE within an SLNAT44 device.

FIG. 4 is a schematic diagram of an embodiment of a NE 400 within an SLNAT44 device (e.g. SLNAT44 140 and/or 240). NE 400 may comprise downstream ports 420, Tx/Rxs 410, a processor 430, a memory 432, and upstream ports 450, which may be substantially similar to downstream ports 320, Tx/Rx 310, processor 330, memory 332, and upstream ports 350. NE 400 may further comprise a NAT44 module 434, which may be configured to perform NAT functions on packets, for example using mapping rule(s) received from an ISP network 130 and/or 230. For example, the NAT44 module 434 may perform steps 503-515 and 603-613 of methods 500 and 600, respectively, as discussed more fully hereinbelow. NE 400 may further comprise a map rule module 436 configured to receive, store, and/or retrieve map rules. For example, the map rule module 436 may perform steps 501, 505, 601, and 605 of methods 500 and 600, respectively, as discussed more fully hereinbelow. NAT44 module 434 may be implemented in processor 430 and map rule module 436 may be implemented in memory 432, respectively. In the alternative, NAT44 module 434 may be implemented as instructions stored in memory 432, which may be executed by processor 430. In another alternative, map rule module 436 may be implemented in processor 430.

Figure 5:
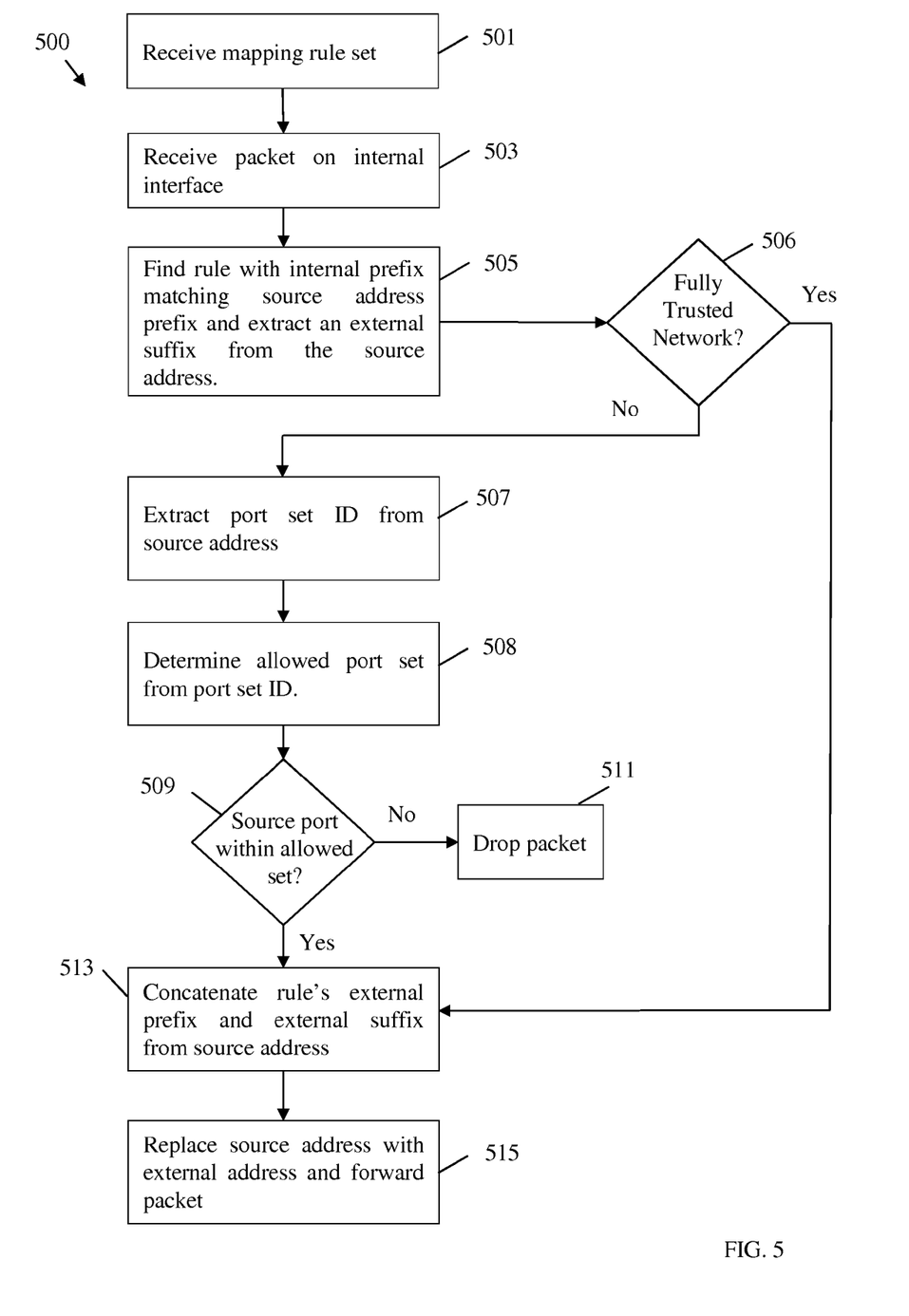
FIG. 5 is a flow chart of an embodiment of a method of SLNAT44.

FIG. 5 is a flow chart of an embodiment of a method 500 of SLNAT44, which may be implemented on a SLNAT44 device such as SLNAT44 140 and/or 240 and/or on an NE such as NE 400 and/or NE component such as NAT44 module 434 and/or map rule module 436. At step 501, the method 500 may receive a mapping rule set. The mapping rule set may comprise at least one mapping rule. Each mapping rule may comprise an internal prefix, an external prefix, a length of the internal prefix, a length of the external prefix, and optionally, a port set mask. If no port set mask is provided, the method 500 may assume that the port set mask comprises bits that are all set to a value of one. At step 503, a packet may be received on an internal interface (e.g. a port facing an ISP network 130 and/or 230) from a downstream node. The packet may comprise a source address field comprising an internal IPv4 source address (e.g. at CPE 120 and/or host 215) and a source port field comprising a value designating a source port (e.g. at CPE 120 and/or host 215). The internal source address may comprise an internal prefix, and an internal suffix, which may comprise an external suffix and a port set ID, as discussed in more detail below with respect to FIG. 9. At step 505, the method 500 may search the rule set to find a mapping rule with an internal prefix that matches the internal prefix of the IPv4 source address. The method may also extract an external suffix from the internal suffix of the IPv4 source address. At step 506, the method 500 may determine if the packet received in step 503 was received from a fully trusted network. The method 500 may perform a source port check if the source network is not trusted, and/or may proceed directly to a NAT operation if the source network is trusted. As such, the method 500 may proceed to step 507 if the packet was not received from a fully trusted network and proceed to step 513 if the packet was received from a fully trusted network. At step 507, the method 500 may extract the port set ID from the packets source address. At step 508, an allowed source port set may be determined by applying the rules port set mask to the port set ID. At step 509, the method 500 may determine if the packet's source port is within the allowed set. The method 500 may proceed to step 511 and drop the packet if the source port is not within the allowed set and may proceed to step 513 if the source port is within the allowed set. At step 513, the method 500 may create an external IPv4 address by concatenating the mapping rule's external IPv4 prefix and the external suffix extracted from the internal source address at step 505. At step 515, the method 500 may replace the packet's internal source address with the external source address created at step 513 and may forward the packet upstream (e.g. toward the Internet 150 and/or 250).

Figure 6:
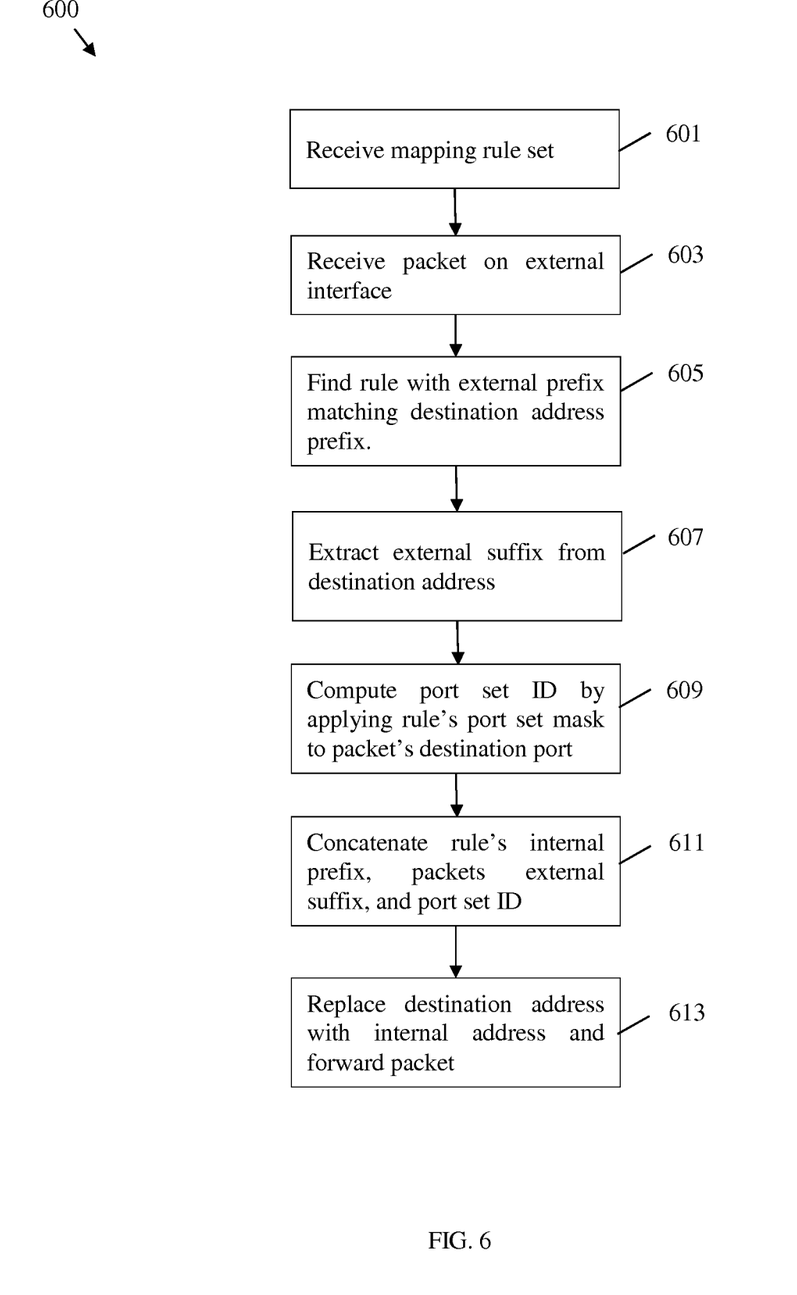
FIG. 6 is a flow chart of another embodiment of a method of SLNAT44.

FIG. 6 is a flow chart of another embodiment of a method 600 of SLNAT44, which may be implemented on a SLNAT44 device such as SLNAT44 140 and/or 240 and/or on an NE such as NE 400 and/or NE component such as NAT44 module 434 and/or map rule module 436. At step 601, mapping rule set may be received in substantially the same manner as step 501. At step 603, a packet may be received on an upstream interface (e.g. from an upstream node in the Internet 150 and/or 250). The packet may comprise a destination address field comprising an external IPv4 destination address comprising an external prefix and an external suffix. The packet may also comprise a destination port field comprising a value designating a destination port (e.g. at CPE 120 and/or host 215), as discussed in more detail below with respect to FIG. 10. At step 605, the method may search the mapping rule set to find a mapping rule with an external prefix matching the external prefix of the packet destination address. At step 607, the external suffix may be extracted from the destination address. At step 609, a port set ID may be computed by applying the mapping rule's port set mask to the packet's destination port. At step 611, an internal IPv4 address may be created by concatenating the mapping rule's internal prefix, the packets external suffix, and the port set ID computed at step 609. At step 613, the method 500 may replace the packet's external destination address with the internal destination address created at step 611 and may forward the packet downstream (e.g. toward the ISP network 130 and/or 230).

It should be noted that, as used in methods 500 and/or 600, external prefixes may comprise a different length than internal prefixes. Specifically, a length of an external prefix in bits may be equal to the length of an internal prefix in bits plus the length of a corresponding port set ID in bits. As such, the internal prefix length and external prefix length as specified in the mapping rules may be used by the methods 500 and/or 600 to determine the beginning and/or ending bit positions of the prefixes, suffixes, and/or port set IDs during NAT44. It should also be noted that in methods 500 and/or 600, the SLNAT44 procedure may check the source port and/or destination port (e.g. for security reasons), but may not translate the source port and/or destination port.

It should also be noted that methods 500 and/or 600 may be applied to IP packets containing data fragments. If the incoming IP packet contains a fragment, then more processing may be needed. When handling such fragmented packets, the external behavior of the SLNAT44 may be compliant several conditions. The SLNAT44 may handle fragments. In particular, the SLNAT44 may handle fragments arriving out of order. Such handling may be conditional on the following: (1) the SLNAT44 may limit the amount of resources devoted to the storage of fragmented packets in order to protect from Denial of Service (DoS) attacks; (2) as long as the SLNAT44 has available resources, the SLNAT44 may allow the fragments to arrive over a time interval, which may be configurable and may comprise a default value of at least 2 seconds; and (3) the SLNAT44 may require that any User Datagram Protocol (UDP), Transmission Control Protocol (TCP), or Internet Control Message Protocol (ICMP) version four (ICMPv4) header be completely contained within the fragment that contains fragment offset equal to zero. For incoming packets carrying TCP or UDP fragments with a non-zero checksum, the SLNAT44 may elect to queue the fragments as they arrive and translate all fragments at the same time. In this case, the incoming tuple may be determined in the same manner as the un-fragmented packets as discussed in methods 500 and/or 600. Alternatively, a SLNAT44 may translate fragments as they arrive, by storing information that allows the SLNAT44 to compute the source and/or destination port number(s) for fragments other than the first. In the latter case, subsequent fragments may arrive before the first, and the regarding handling out-of-order fragments may apply.

Figure 7:
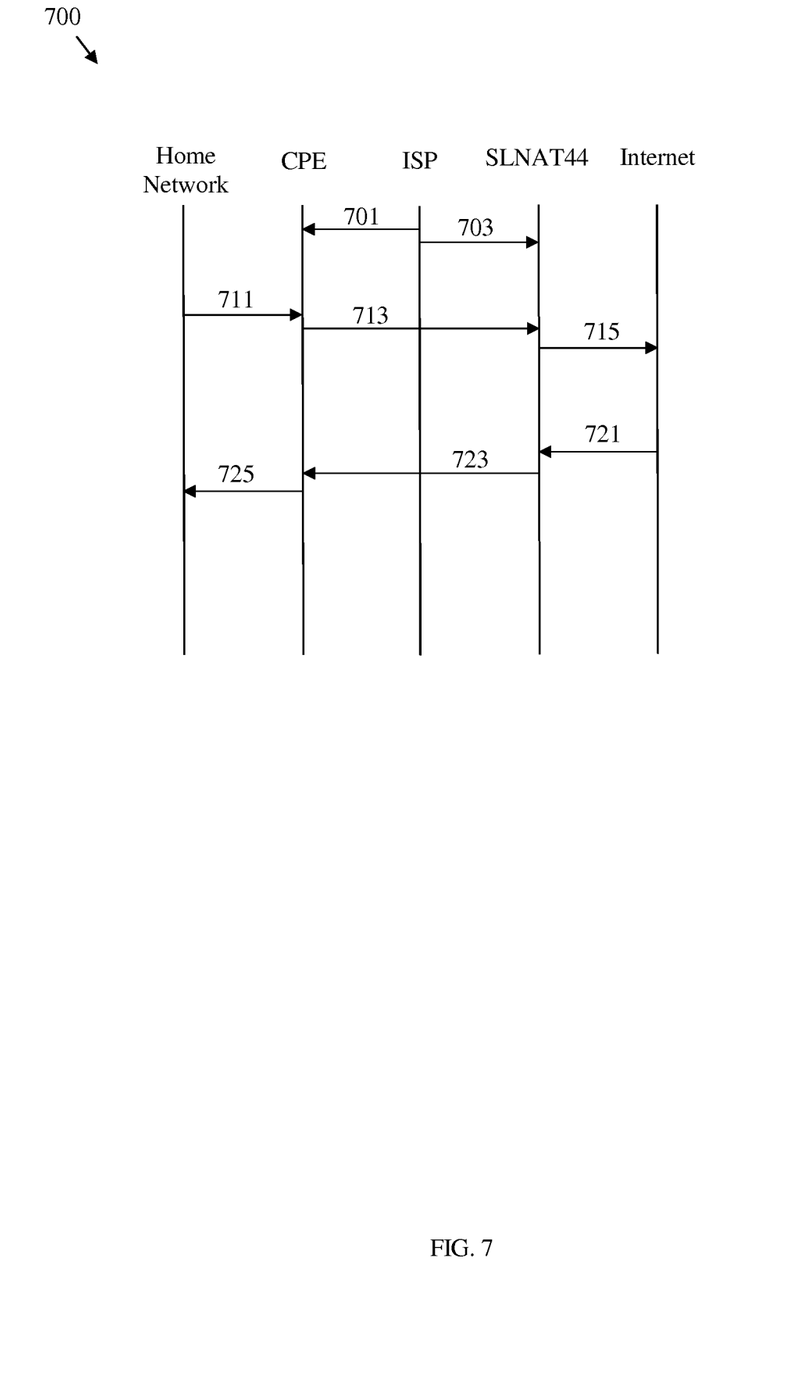
FIG. 7 is a protocol diagram of an embodiment of a method of configuring a SLNAT44 network for SLNAT44.

FIG. 7 is a protocol diagram of an embodiment of a method 700 of configuring a SLNAT44 network (e.g. network 100) for SLNAT44. At step 701, one or more nodes in an ISP network (e.g. provisioning module 334) may assign an internal IPv4 address and/or internal IPv4 prefix to the CPE along with a Port set ID and/or a port set mask. At step 703, one or more nodes in an ISP network (e.g. configuration module 336) may transmit a mapping rule set to an SLNAT44 (e.g. as discussed in steps 501 and/or 601).

At step 711, a host in a home network may transmit a packet upstream. At step 713, the CPE may convert the packet's source address to an IPv4 internal source address and forward the packet to the SLNAT44. The CPE may encode the IPv4 port set ID in the IPv4 internal source address. The CPE may also apply the port set mask to the port set ID to determine a set of source ports allowed by the ISP. The port set mask may be the same length as the port set ID in bits, and may be used to algorithmically determine allowed port sets with discontinuous port ranges. If no port set mask is provided, the mask may be assumed to comprise all bits set to a value of one, which may indicate a continuous allowed port range set. Port ranges from about zero to about 1023 may not be assigned to any CPE. Once the CPE has determined the allowed port set, the CPE may select a source port in the allowed set and transmit the packet using the selected source port and the internal IPv4 address as the source address. At steps 713-715, the SLNAT44 may perform steps 503-509 and 513-515. Specifically, the SLNAT44 may determine the allowed port set based on the packet's port set ID and the port set mask from the associated mapping rule, ensure the packet was sent from an allowed source port, create an external IPv4 address using an external IPv4 prefix from the mapping rule and the external suffix extracted from the source address, replace the internal source address with the external source address, and forward the packet upstream towards the internet.

At step 721, the SLNAT44 may receive a packet from the Internet. For example, the packet of step 721 may be responsive to the packet of step 715. At step 721-723, the SLNAT44 may perform steps 603-613. Specifically, the SLNAT44 may use the mapping rule to determine to appropriate internal destination IPv4 prefix, extract the external IPv4 suffix from the destination address, generate the port set ID by applying the port set mask to the destination port, create the internal IPv4 address, replace the external destination address with the internal IPv4 address, and forward the packet downstream toward the CPE. At step 725, the CPE may translate the internal IPv4 address into an address space used by the home network and forward the packet toward the host designated by the CPE's routing tables.

It should be noted that in method 700, the customer provisioning may be applied to the CPE as the may CPE serve as gateway (e.g. network 100). When the CPE is configured in to operate in bridge mode (e.g. network 200), all the above features may be provisioned directly to the end host behind the CPE (e.g. host 215). As such, when the CPE is in bridge mode, step 701 sends associated information directly to the hosts, steps 711 and 723 may be omitted, step 713 may originate from the host and pass through the CPE unchanged, and step 723 may pass through the CPE unchanged to end at the host.

Regardless of CPE mode, customer provisioning (e.g. step 701) may be either dynamic or static. Static provisioning may imply an address planning for the private IPv4 addresses inside a specified domain (e.g. home network). Static provisioning may enable servers (e.g. passive daemons) at the home network to be accessible within the domain. A CPE running as bridge may deploy static provisioning while running as level three (L3) gateway (e.g. not in bridge mode) may require port redirection if an in-domain server at a host (e.g. 215) is demanded.

Figure 8:
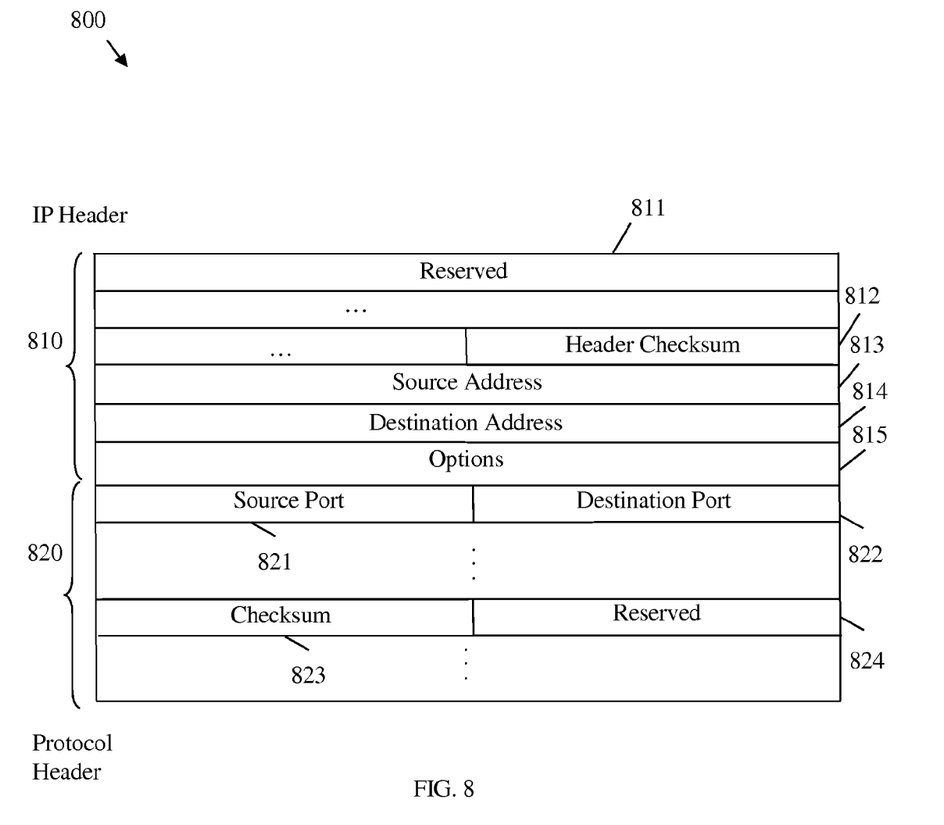
FIG. 8 is a schematic diagram of an embodiment of a IPv4 packet header.

FIG. 8 is a schematic diagram of an embodiment of a IPv4 packet header 800, which may be translated by a CPE (e.g. CPE 120) and/or a SLNAT44 (e.g. SLNAT44 150 and/or 250), for example at steps 711-725. The IPv4 packet header 800 may comprise a plurality of fields encoded in successive thirty two bit sections, which may be numbered from bit position zero to bit position thirty one. The IPv4 packet 800 may comprise an IP header 810 and a protocol header 820. The IP header may be in a general form used by all types of IPv4 packets and the protocol header 820 may be in a form specific to an associated protocol, such as TCP, UDP, etc.

The IP header 810 may comprise reserved field 811, which may be employed for routing and/or other purposes not discussed herein. The IP header 810 may further comprise a header checksum field 812, which may be sixteen bits in length, may extend from the sixteenth bit position to the thirty first bit position, and may be set to a value used for error checking. The value of the header checksum field 812 may be the result of performing a checksum function on the bits of the IP header 810. As such, when NAT operation is performed on the IP header 810, the header checksum field 812 may be updated to reflect any changes in values in the fields of the IP header 810. The IP header 810 may further comprise a source address field 813, which may be thirty two bits in length, may extend from the zero bit position to the thirty first bit position, and may be set to a value indicating an IPv4 source address in an address space (e.g. internal source address, external source address, etc.) The IP header 810 may further comprise a destination address field 814, which may be thirty two bits in length, may extend from the zero bit position to the thirty first bit position, and may be set to a value indicating an IPv4 destination address in an address space (e.g. internal destination address, external destination address, etc.) The IP header 810 may further comprise an options field 815, which may be of variable length and may comprise optional IP header data.

The protocol header 820 may comprise a source port field 821, which may be sixteen bits in length, may extend from the zero bit position to the fifteenth bit position, and may be set to a value to indicate a source port that transmitted the packet. The protocol header 820 may further comprise a destination port field 822, which may be sixteen bits in length, may extend from the sixteenth bit position to the thirty first bit position, and may be set to a value to indicate a destination port that should receive the packet. In the SLNAT44 operations discussed herein, the source port and/or the destination port may be determined by and/or used to determine port set ID and may be selected from an allowed range assigned by an ISP network (e.g. ISP network 130 and/or 230). The protocol header 820 may further comprise a checksum field 823, which may be sixteen bits long, may extend from the zero bit to the fifteenth bit, and may be used for error checking of the protocol header 820 in a similar manner to header checksum 812. As such, checksum field 823 may be updated content of the protocol header changes during a NAT operation (e.g. changes to destination port, source port, etc.) The protocol header 820 may further comprise various reserved fields 824, which may be employed for other purposes.

Figure 9:
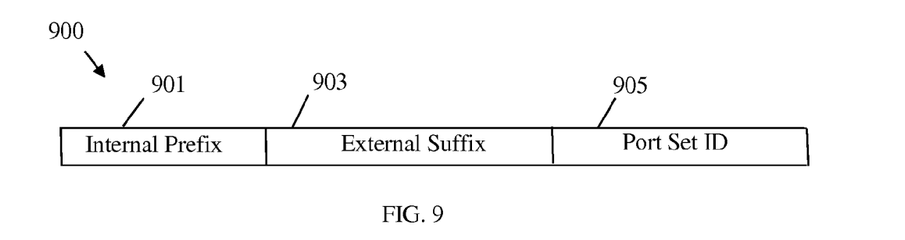
FIG. 9 is a schematic diagram of an embodiment of an internal IPv4 address encoding.

FIG. 9 is a schematic diagram of an embodiment of an internal IPv4 address 900 encoding, such as an IPv4 address recognized by an ISP network 130 and/or 140, which may be used in steps 713 and/or 723. The internal IPv4 address 900 may be thirty two bits in length, may extend from the zero bit position to the thirty first bit position, and may comprise an internal prefix 901, an external suffix 903, and a port set ID 905. The external suffix 903 the port set ID 905 may be considered the IPv4 addresses' 900 internal suffix. The internal prefix 901, external suffix 903, and port set ID 905 may each vary in length as long as the total IPv4 address 900 remains thirty two bits long. As such, the NAT entities (e.g. SLNAT44 150 and/or 250) may be informed of the lengths prior to NAT (e.g. via mapping rules), for example by the ISP network 130 and/or 230.

Figure 10:
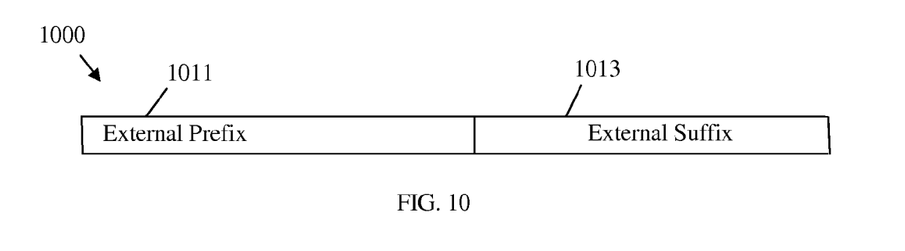
FIG. 10 is a schematic diagram of an embodiment of an external IPv4 address encoding.

FIG. 10 is a schematic diagram of an embodiment of an external IPv4 address 1000 encoding, such as an IPv4 address recognized upstream of a SLNAT44 (e.g. SLNAT44 140 and/or 240), which may be used in steps 715 and/or 721. The external IPv4 address 1000 may be thirty two bits in length, may extend from the zero bit position to the thirty first bit position, and may comprise an external prefix 1011 and an external suffix 1013. The external prefix 1011 and external suffix 1013 may each vary in length as long as the total IPv4 address 900 remains thirty two bits long. As such, the NAT entities (e.g. SLNAT44 150 and/or 250) may be informed of the lengths prior to NAT (e.g. via mapping rules), for example by the ISP network 130 and/or 230.

The internal IPv4 address 900 and/or the external IPv4 address 1000 may be positioned in the source address field 813 and/or the destination address field 814 depending on the direction and location of the packet. Also, the value of port set ID 905 may be used to determine a value for source port field 821 and/or destination port field 822 as well as check values of source port field and/or destination port field 822, respectively. As discussed above, the lengths of the internal prefix 901, external suffix 903, port set ID 905, external prefix 1011 and/or external suffix 1013 may be variable. As such, the length of the internal prefix 901 defined as a and the length of external prefix 1011 defined as b may be mandatory parameters to the SLNAT44, and may be determined by the ISP. Lengths a and b may or may not be communicated to the CPE. Other lengths may be computed as follows: length of external suffix 903 and/or 1013=32−b and length of port set ID 905=b−a.

Figure 11:
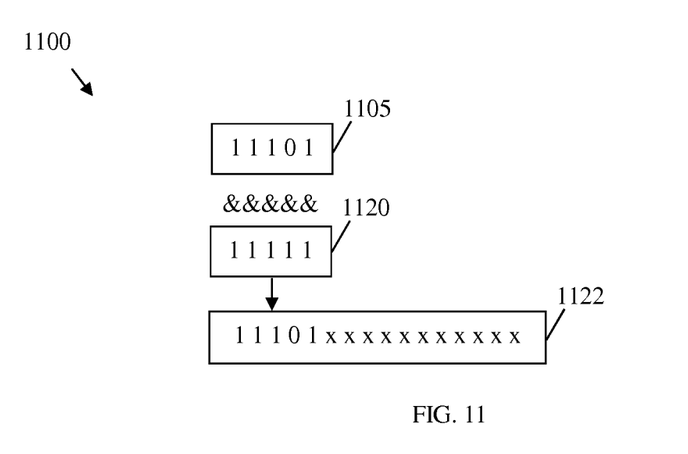
FIG. 11 is a diagram of an example contiguous port set computation.

FIG. 11 is a diagram of an example contiguous port set computation 1100. To determine an allowed port set 1122, an and operation may be applied to port set ID 1105 and a port set mask 1120. Port set mask 1120 may be the same length as port set ID 1105. Given a port set ID 1105 and a port set mask 1120, both n bits in length, the set of allowed ports 1122 may be defined as the set of port numbers for which the higher-order n bits of their binary expression whose corresponding mask bits are 1 are equal to corresponding bits from the port set ID 1105. As such, port set mask 1120 may be set to a value of all ones to indicate a continuous allowed port set 1122. An and operation between a port set ID 1105 set to a binary value of 11101 and a port set mark 1120 with set to a binary value of 11111 may result in an allowed port set 1122 of 1101xxxxxxxxxxxx, where x may be any value. Converting allowed port set 1122 to base ten numbering may result in an allowed port set of 59,392-61,439.

Figure 12:
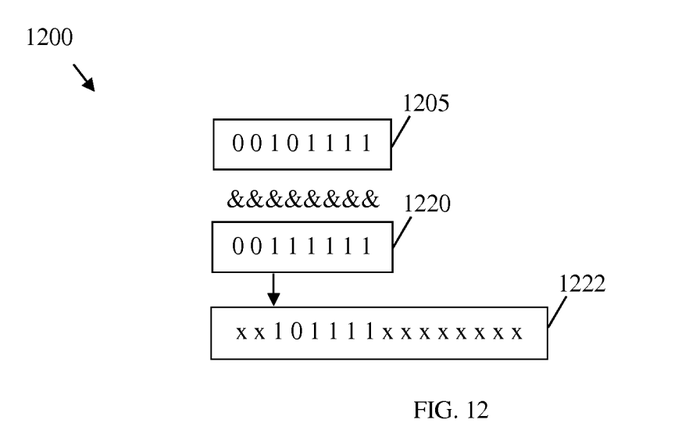
FIG. 12 is a diagram of an example noncontiguous port set computation.

FIG. 12 is a diagram of an example noncontiguous port set computation 1200. Computation 1200 may comprise a port set ID 1205, a port set mask 1220 and an allowed port set 1222, which may be similar to port set ID 1105, port set mask 1120, and allowed port set 1112. However, port set ID 1205 and port set mask 1220 may be eight bits long and may be set to values of 00101111 and 00111111, respectively. When an and operation is performed on the port set ID 1205 and port set mask 1220, the resulting allowed port set 1222 may be a value of xx101111xxxxxxxx, which may denote the discontinuous allowed port set 12,032-12,287; 28,416-28,671; 44,800-45,055; and 61,184-61,439.

It may follow that the number of ports in the set may be 2^(16−x), where x is the number of ones in a Port Set Mask. This computation (e.g. computation 1100 and/or 1200) may be performed by the CPE (e.g. 120) and/or hosts 215 as part of a provisioning routine as well as by the SLNAT44 (e.g. SLNAT44 140 and/or 240) for dropping packets with ports outside the allowed range. For the purposes of SLNAT44, a source port may correspond to a TCP source port, a UDP source port, and/or an ICMPv4 identifier, and a destination port may correspond to a TCP destination port, a UDP destination port, and/or an ICMPv4 identifier, respectively. It should be noted that an ICMPv4 identifier may play the role of both a source and a destination port. Transport protocols other than TCP and UDP, as well as ICMPv4 types without an identifier field may not be supported by some embodiments discussed herein.

As another example, an operator (e.g. ISP network 130 and/or 230) may employ two public ranges (e.g. internal IPv4 suffixes) of size/18 and/19 called foo and bar respectively. The operator may use 10/8 as an internal address prefix and a Port Set ID (port range) of length 5. The internal prefixes lengths may be: 32−18−5=13 (derived from foo); and 32−19−5=14 (derived from bar). This may result in the following possible mappings: foo/18<—>10.0.0.0/13 and bar/19<—>10.128.0.0/14.

Figure 13:
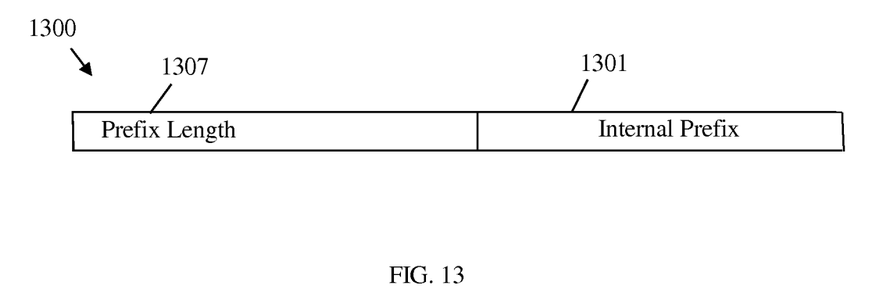
FIG. 13 is a schematic diagram of an embodiment of an internal prefix mapping rule option encoding.

FIG. 13 is a schematic diagram of an embodiment of an internal prefix mapping rule option 1300 encoding, which may be employed to transmit an internal IPv4 prefix and associated prefix length (e.g. to a SLNAT44 140 and/or 240) as part of a mapping rule. The internal prefix mapping rule option 1300 may comprise a prefix length field 1307 and an internal prefix field 1301. The prefix length field 1307 may be sixteen bits in length, may extend from the zero bit position to the fifteenth bit position, and may comprise a value indicating the length of an associated internal prefix (e.g. in internal prefix field 1301). The internal prefix field 1301 may be sixteen bits in length, may extend from the sixteenth bit position to the thirty first bit position, and may comprise a value indicating an internal prefix.

Figure 14:
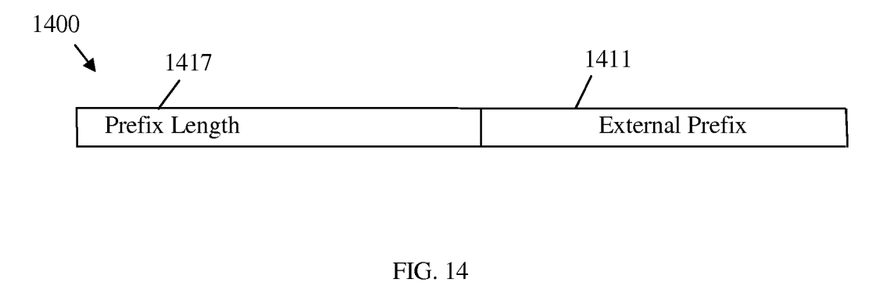
FIG. 14 is a schematic diagram of an embodiment of an external prefix mapping rule option encoding.

FIG. 14 is a schematic diagram of an embodiment of an external prefix mapping rule option 1400 encoding, which may be employed to transmit an external IPv4 prefix and associated prefix length (e.g. to a SLNAT44 140 and/or 240) as part of a mapping rule. The external prefix mapping rule option 1400 may comprise a prefix length field 1417 and an external prefix field 1411. The prefix length field 1417 may be sixteen bits in length, may extend from the zero bit position to the fifteenth bit position, and may comprise a value indicating the length of an associated external prefix (e.g. in external prefix field 1411). The external prefix field 1411 may be sixteen bits in length, may extend from the sixteenth bit position to the thirty first bit position, and may comprise a value indicating an external prefix.

Figure 15:
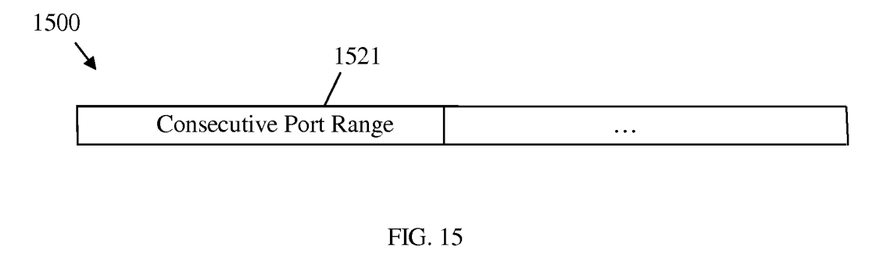
FIG. 15 is a schematic diagram of an embodiment of a consecutive port range option encoding.

FIG. 15 is a schematic diagram of an embodiment of a consecutive port range option 1500 encoding, which may be employed to transmit a port range mask (e.g. to a SLNAT44 140 and/or 240) as part of a mapping rule. The consecutive port range option 1500 may comprise a consecutive port range field 1521, which may be sixteen bits in length, may extend from the zero bit position to the fifteenth bit position, and may comprise a value indicating a port range mask for determining a consecutive allowed port set (e.g. from a port set ID). The port range mask may be encoded in the leading and/or higher order bits of consecutive port range field 1521. For example, the consecutive port range field 1521 may be encoded as yyyyyyxxxxxxxxxx, where y indicates a port range bit, x indicates allowed ports, and the encoded port range mask has a length of six bits.

Figure 16:
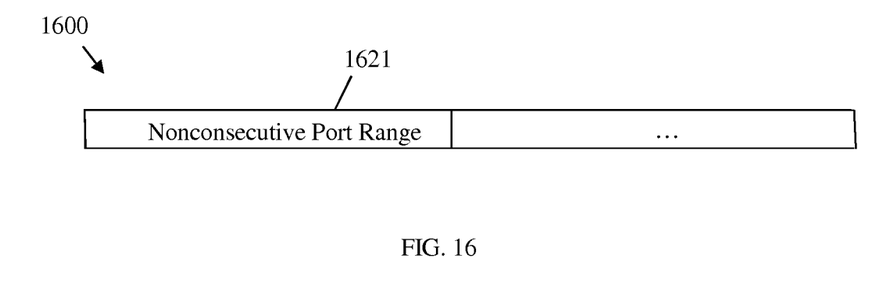
FIG. 16 is a schematic diagram of an embodiment of a nonconsecutive port range option encoding.

FIG. 16 is a schematic diagram of an embodiment of a nonconsecutive port range option 1600 encoding, which may be employed to transmit a port range mask (e.g. to a SLNAT44 140 and/or 240) as part of a mapping rule. The nonconsecutive port range option 1600 may comprise a nonconsecutive port range field 1621, which may be sixteen bits in length, may extend from the zero bit position to the fifteenth bit position, and may comprise a value indicating a port range mask for determining a nonconsecutive allowed port set (e.g. from a port set ID). The port range mask may be encoded in any position in the nonconsecutive port range field 1621. For example, the nonconsecutive port range field 1621 may be encoded as xyxyyxxxyxxyxyxx, where y indicates a port range bit, x indicates allowed ports, and the encoded port range mask has a length of fourteen bits.

Figure 17:
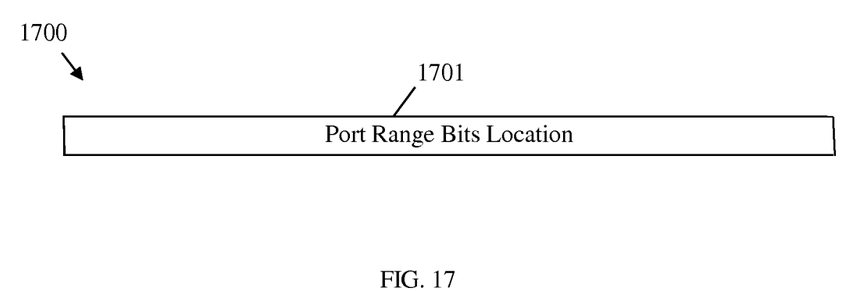
FIG. 17 is a schematic diagram of an embodiment of a port range bit location in private IPv4 address option encoding.

FIG. 17 is a schematic diagram of an embodiment of a port range bit location in private IPv4 address option 1700 encoding, which may be employed to indicate the location of a port set ID (e.g. to a SLNAT44 140 and/or 240) as part of a mapping rule when port set ID bits are interspersed among private IPv4 suffix bits. The option 1700 may comprise a port range bits location field 1701, which may be thirty two bits in length, may extend from the zero bit position to the thirty first bit position, and may comprise a value indicating the location of a port set ID in an internal IPv4 address. For example, the option 1700 may be encoded as 00000000000000010010000010001000 to indicate that an internal IPv4 address with an internal suffix of length 18 (e.g. with a leading prefix of length 14) is encoded as ipiipinnpii-ipiii where i indicates the location of a suffix bit and p indicates the location of a port set ID and/or port range bit.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a memory; and
    a processor coupled to the memory and configured to:
        receive a mapping rule that associates a downstream internal Internet Protocol version four (IPv4) address prefix to an upstream external IPv4 address prefix;
        receive a first IPv4 packet from an upstream network node with a destination address field comprising an external IPv4 address comprising the external prefix; and
        perform a first network address translation IPv4 to IPv4 (NAT44) process by replacing the external IPv4 address in the first IPv4 packet's destination address field with an internal IPv4 address based on the mapping rule,
    wherein the internal IPv4 address comprises the internal prefix and a port set identifier (ID) associated with a set of destination ports at a downstream node assigned to receive the first IPv4 packet.

2. The apparatus of claim 1, wherein the mapping rule further associates the internal prefix to a port set mask.

3. The apparatus of claim 2, wherein the first IPv4 packet further comprises a destination port field comprising a value indicating a requested destination port at the downstream node, and wherein the processor is further configured to apply the port set mask to a destination port value to determine the port set ID.

4. The apparatus of claim 3, wherein the external IPv4 address further comprises an external suffix, and wherein the processor is further configured to create the internal IPv4 address by:
    concatenating the port set ID to the external suffix to create an internal suffix; and
    concatenating the internal suffix to the internal prefix.

5. The apparatus of claim 1, wherein the first NAT44 process does not comprise the creation of an internet protocol version six (IPv6) address.

6. The apparatus of claim 1, wherein the first NAT44 process is stateless and does not translate the first IPv4 packet based on a data flow to which the first packet belongs, and wherein the first NAT44 process is not limited by a number of active data flows in a downstream network.

7. The apparatus of claim 2, wherein the processor is further configured to:
    receive a second IPv4 packet from a downstream node, wherein the second IPv4 packet comprises a source address field comprising an internal IPv4 address that comprises an internal prefix and a port set ID, wherein the second IPv4 packet further comprises a source port field that comprises a value indicating a source port at the downstream node that transmitted the second IPv4 packet;
    apply a port set mask associated with a second mapping rule to the port set ID to determine a set of source ports assigned to transmit the second IPv4 packet; and
    drop the second IPv4 packet if the source port that transmitted the second IPv4 packet is not in the determined source port set.

8. The apparatus of claim 7, wherein the processor is further configured to perform a second NAT44 process by replacing the internal IPv4 address in the second IPv4 packet's source address field with an external IPv4 address, wherein the internal IPv4 address further comprises an internal suffix that comprises the port set ID and an external suffix, and wherein the external IPv4 address is created by:
    obtaining the external prefix associated with the internal prefix based on the second mapping rule; and
    obtaining the external suffix from internal IPv4 address; and
    concatenating the external prefix to the external suffix.

9. The apparatus of claim 8, wherein the second NAT44 process is performed prior to the first NAT44 process.

10. The apparatus of claim 9, wherein the set of source ports and the set of destination ports each comprise Transmission Control Protocol (TCP) source ports, User Datagram Protocol (UDP) source ports, Internet Control Message Protocol (ICMP) version four (ICMPv4) identifiers, or combinations thereof.

11. The apparatus of claim 1, wherein the set of destination ports are nonconsecutive.

12. The apparatus of claim 1, wherein the internal IPv4 address further comprises an internal suffix, wherein the internal suffix comprises an external suffix and the port set ID, and wherein bits of the port set ID are interspersed between bits of the external suffix.

13. The apparatus of claim 1, wherein the mapping rule is received from a network element (NE) in an internet service provider (ISP) network.

14. The apparatus of claim 1, wherein the processor is further configured to:
receive a third IPv4 packet from a downstream node; and
perform a third NAT44 process without determining whether a source port of the third IPv4 packet is within an allowed set if the downstream node is positioned in a fully trusted network.

15. The apparatus of claim 1, wherein the mapping rule comprises a port set ID length, a port set ID position, or combinations thereof.

16. A computer program product comprising computer executable instructions stored on a non-transitory computer readable medium such that when executed by a processor cause a network element (NE) to:
assign an Internet Protocol version four (IPv4) address and a port set identifier (ID) to an end node; and
configure a stateless network address translation IPv4 to IPv4 (SLNAT44) device with a set of mapping rules, wherein at least one of the mapping rules comprises an internal prefix associated with the end node, an external prefix associated with the end node, a length of the internal prefix, and a length of the external prefix,
wherein the instructions that cause the NE to provision a port set mask for the end node, wherein the port set mask and the port set ID are a same length in bits, wherein at least one of the mapping rules further comprises the port set mask, wherein the port set mask allows for use of discontinuous port ranges in a SLNAT44 operation in the SLNAT44 device,
wherein the instructions cause the NE to provision the port set mask for the end node, wherein the port set mask and the port set ID are a same length in bits, wherein at least one of the mapping rules further comprises the port set mask, and wherein the port set mask allows for use of discontinuous port ranges in a SLNAT44 operation in the SLNAT44 device.

17. The computer program product of claim 16, wherein the end node is a Customer Premises Equipment (CPE) or wherein the end node is an end host behind a CPE configured in a bridge mode.

18. A method comprising:
receiving a set of mapping rules, wherein each of the mapping rules comprises an internal prefix, an external prefix, a length of the internal prefix, a length of the external prefix, and a port set mask;
receiving a first packet on an internal interface;
finding a first mapping rule with an internal prefix that matches a source address of the first packet;
extracting a port set identifier (ID) from the first packet's source address;
checking whether a source port of the first packet is within an allowed set using the found mapping rules port set mask;
building an external address by concatenating the found mapping rule's external prefix with an external suffix extracted from the first packet's source address when the first packet's source port is within the allowed set;
replacing the first packet's source address with the external address when the first packet's source port is within the allowed set; and
forwarding the first packet when the first packet's source port is within the allowed set.

19. The method of claim 18, further comprising:
receiving a second packet on an external interface;
finding a second mapping rule, wherein the second mapping rule comprises an external prefix that matches a destination address of the first packet;
building an internal address by concatenating the second mapping rule's internal prefix, an external suffix extracted from the second packet's destination address, and a port set ID, wherein the port set ID is computed by applying the second mapping rule's port set mask to a destination port of the first packet;
replacing the second packet's destination address with the internal address; and
forwarding the second packet.

20. A method comprising:
receiving a set of mapping rules, wherein each of the mapping rules comprises an internal prefix, an external prefix, a length of the internal prefix, and a length of the external prefix;
receiving a packet on an internal interface;
finding a mapping rule with an internal prefix that matches a source address of the packet;
building an external address by concatenating the found mapping rule's external prefix with an external suffix extracted from the packet's source address;
replacing the packet's source address with the external address; and
forwarding the packet.

21. The method of claim 20, wherein the method further comprises determining whether the packet is received from a fully trusted network.

22. The method of claim 21, wherein the found mapping rule further comprises a port set mask, and wherein when the packet is not received from a fully trusted network, the method further comprises:
extracting a Port Set identifier (ID) from the packet's source address;
applying the port set mask associated to the port set ID to determine a set of source ports allowed to transmit the packet; and
determining whether the packet was received from a source port in the allowed source port set.

23. The method of claim 21, wherein when the packet is received from a fully trusted network, the method does not comprise determining whether the packet was received from a source port in an allowed source port set.

* * * * *